Figure 1:
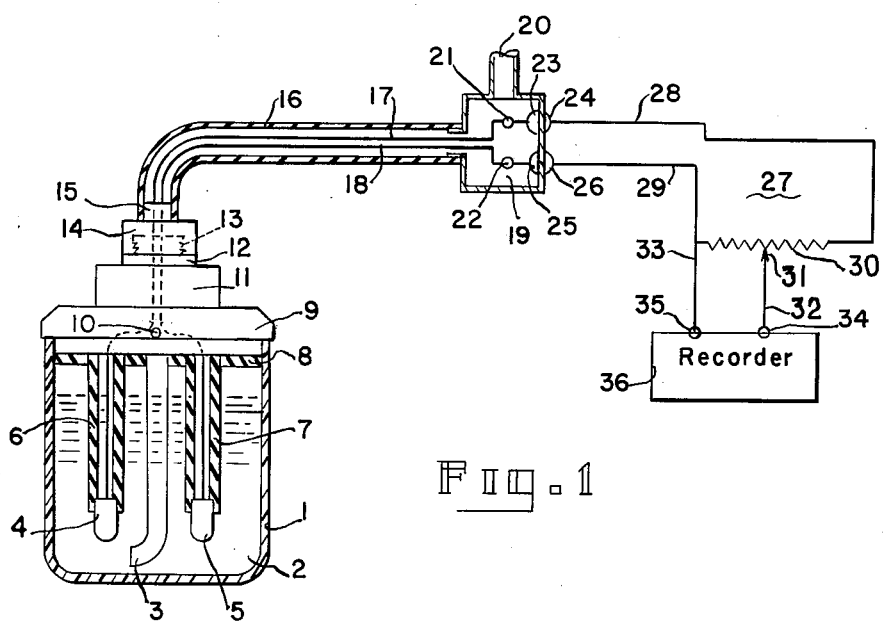

April 17, 1962 S. D. REEDER 3,030,510
METHOD AND APPARATUS FOR MEASURING RADIATION
Filed April 11, 1960

INVENTOR.
Seth D. Reeder
BY
Attorney

United States Patent Office 3,030,510
Patented Apr. 17, 1962

3,030,510
METHOD AND APPARATUS FOR MEASURING RADIATION
Seth D. Reeder, Idaho Falls, Idaho, assignor to the United States of America as represented by the United States Atomic Energy Commission
Filed Apr. 11, 1960, Ser. No. 21,570
1 Claim. (Cl. 250—83.3)

The invention relates to a novel method for measuring radiation and to a novel apparatus for carrying it out.

The measurement of radiation has become important in science and industry in many instances, in metallurgy where the effects of radiation on metals are determined, in polymer chemistry where radiation is used to produce plastics or to modify their properties, in general chemistry where unusual reactions are carried out with the aid of radiation, in physics where radiation flux fields are mapped, and in the biological sciences where the effects of radiation on tissues and biochemicals are studied. In such cases accurate measurements of either the rate or total dosage of radiation, and often of both, are needed.

Ion chambers are widely used at gamma and other irradiation facilities to determine doses in generalized locations, but they are too large to be used when it is desired to map a nonuniform radiation flux field in detail, or to determine the dose received by a small specimen. In cases of the latter kind chemical dosimeters are used, consisting of small sealed vials containing some chemical system of an oxidation-reduction character that will react quantitatively when exposed to the particular type of radiation. By such a system is meant a solvent such as water, a pH adjuster which may be an acid, a base, a buffer salt or a combination of these, and a solute salt which exists in an oxidized form and a reduced form, the amounts of the forms, as well as the hydrogen and hydroxyl ion concentrations, varying with the degree of oxidation of the solute salt. After a period of time the dosimeter is taken from the flux and analyzed chemically to determine to what extent the radiation-induced reaction has taken place, from which the amount of irradiation may be deduced. Such dosimeters have the disadvantage that they yield information only on the total dose over the period of time and do not indicate whether there were any variations of the flux within the period; also, they are subject to errors of two kinds, one due to imperfect timing of the period, and even more serious, error due to inaccurate positioning of the dosimeter within the flux, such as when one is lowered on a wire inside a nuclear reactor. Since practically all sources of radiation, other than X-rays, have to be run continuously it is not practical to shut them down each time a dosimeter is inserted to check its position in the flux.

Of the various kinds of radiation, gamma radiation is the most widely used at the present time, with the possible exception of X-rays, in which dose measurement is not so much of a problem since X-ray dosage can be determined in advance by controlling their source. The present invention is addressed chiefly to the measurement of gamma radiation, although it may be applied generally to the measurement of other kinds of radiation as well.

It is, accordingly, the object of the invention to provide a method of measuring radiation in terms of flux rate or total dosage, incorporating all the advantages of chemical dosimetry but eliminating the need for post-chemical analysis and accurate time withdrawal of the dosimeter.

It is a further object of the invention to provide such a method which will be free from errors of timing and positioning.

It is a further object to provide such a method when the radiation is gamma rays.

It is a further object to provide an apparatus for carrying out the method mentioned, which apparatus shall be sufficiently small in size that it may be inserted into irradiation specimens.

It is a further object to provide such an apparatus which will be sufficiently small to map the variations in nonuniform radiation flux fields.

All the foregoing objects are attained by my discovery that chemical oxidation-reduction system dosimeters may be made electrolytic by inserting electrodes sensitive to the oxidation state of the system within them and connecting these electrically with a potential sensing device such as a potentiometer, whereby the progress of the radiation-induced oxidation-reduction reaction may be monitored continuously. In this way different radiation fluxes may be determined, and since such a dosimeter may be left unattended for an extended period without having to withdraw it from the flux to make a chemical analysis of its contents it may be positioned more deliberately than is feasible when this has to be done before every reading. Thus, as a practical matter, the chance of making an error in positioning is greatly reduced.

Attention is now directed to FIGURE 1 which is a partly sectional, partly schematic illustration of a preferred embodiment of the invention.

Figure 2:
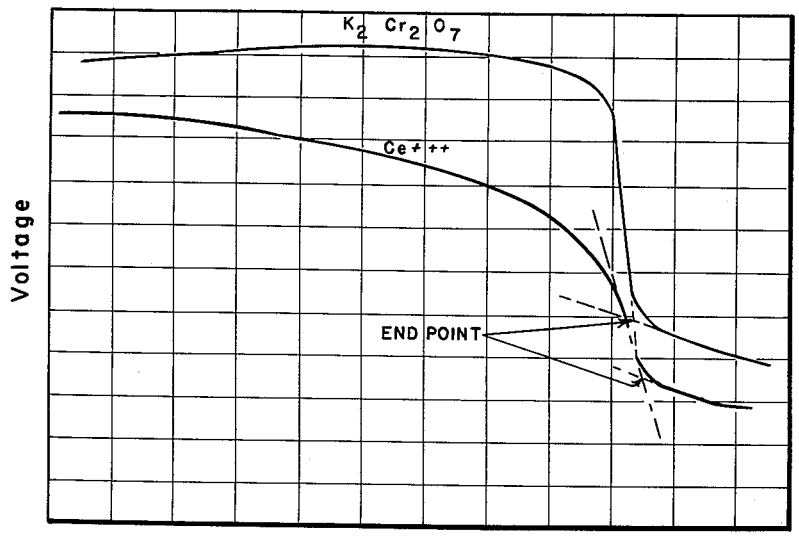

FIGURE 2 is a graph of voltage plotted against time based on data taken from the apparatus of the invention.

The preferred dosimeter of FIGURE 1 consists of an outer container of roughly beaker shape, which may be of any suitable corrosion-resistant material such as glass, polyethylene or other plastic; polyethylene is my preferred material for this purpose. The container 1 is filled with solution 2 of the chemical oxidation-reduction system, the reaction of which is induced by the type of radiation to be measured, as will be explained in detail later herein. Tube 3 conducts a gas such as argon, or air if the chemical system is not affected by air, for agitating the solution 2 in order to keep it at equilibrium. Electrode 4 is the cathode which may be gold, platinum or other inert metal, and electrode 5 is the anode which may be antimony or tungsten. Electrode 4 is surrounded by insulating sleeve 6 of Micarta or other non-conductive, corrosion resistant material, and electrode 5 is surrounded by a similar insulating sleeve 7. Insulating annular gasket 8, of similar material is affixed to the bottom side of hollow metal cover 9, which is preferably of aluminum. Vent hole 10 in hollow cover 9 permits the agitating gas from tube 3, as well as any hydrogen or other gas generated in the dosimeter cell to escape. Collar 11 is held in place by the coaction of threaded pipe 13 and knurled washer 12, which when tightened causes a shoulder (not shown) at the lower end of threaded pipe 13 to rise up and tighten against an orifice (not shown) in the top of hollow cover 9. Knurled threaded coupler 14 brings threaded pipe 13 and a shoulder (not shown) on the lower end of nipple 15 into tight abutting relationship, and resilient tubing 16 of rubber or other similar material is press-fitted over nipple 15. Insulated wires 17 and 18 connect with cathode 6 and anode 7 respectively by passing through holes (not shown) in nipple 15, which may be metal, but preferably of some plastic of high strength such as nylon or Teflon. Tubing 16 is gas-tightly joined to terminal box 19, having gas inlet 20, and terminals 21 and 22 for wires 17 and 18 respectively. Paired electrical connectors 23 and 24 and 25 and 26 join the circuit of the dosimeter to that of the sensing device such as the recording potentiometer shown generally at 27. Recording potentiometer 27 consists of wires 28 and 29 leading to either end of resistance 30, sliding electrical connector 31 and wires 32 and 33 leading respectively from sliding connector 31 and the left end of resistance 30 to terminals 34 and 35 of recorder 36. Recorder 36 contains the usual opposing E.M.F. source (not shown) of a potentiometer, and a means of recording continuously on a moving strip of paper any variations of potential in the potentiometer. The details of the recorder are not a part of the present invention, and accordingly, are not shown.

Any of the oxidation-reduction chemical systems may be used in carrying out my invention. I have had best results, and I prefer a member of the group of systems consisting of ferric-ferrous, ceric-cerous, and dichromate systems in acid solution. The concentrations of the starting solution should be rather low, from about 1000–50,000 microequivalents, or 1–50 milliequivalents per liter of the ceric, ferric, dichromate or other salt in the higher oxidation state, in acid of about 0.7 to 1.0 N, preferably $H_2SO_4$. I prefer as salts in the starting solution ceric sulfate, ferric sulfate, and potassium dichromate; under gamma radiation these will be reduced to the cerous, ferrous, and plus three state respectively in acid solution. The reduction reaction of the millimolar quantities of the salts will generate a small potential between the electrodes but no substantial current will pass or corrosion of the anode take place due to the counter-E.M.F. of the potentiometer, which preferably has a resistance element of about 25 thousand ohms. As shown by FIGURE 2, the potential or voltage of the dosimeter cell falls off gradually, for both $K_2Cr_2O_7$ and $Ce^{+++}$, until an end point is approached due to the depletion of the salt in the higher oxidation state, and then falls abruptly until the end point is reached as indicated by the arrows. The time required to reach the end point, the initial concentration of the solution, and the radiation yield are used to determine the gamma flux.

While I do not wish to be bound by any particular theory, it is believed that the oxidation-reduction reaction induced by gamma rays is due to the decomposition of water into hydrogen and hydroxyl free radicals which react with water to produce hydrogen peroxide according to the following equations:

$HOH = H + OH$ _____ (1) $G_1 = 2.35$.
$HOH = \frac{1}{2}H_2 + \frac{1}{2}H_2O_2$ _____ (2) $G_2 = 0.46$.
$HOH = H + \frac{1}{2}H_2O_2$ _____ (3) $G_3 = 1.42$.

When the salt in the higher oxidation state such as ceric sulfate is preponderant in the solution it is reduced by the hydrogen free radicals; the hydrogen peroxide causes a slower reaction in the opposite direction at the same time, but it is not a strong enough oxidizing agent to offset the reduction reaction, and the equilibrium of the system results in a net gain to the right in this fashion:

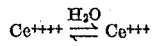

Or, in equilibrium notation, the situation may be expressed as:

$$K = \frac{[Ce^{+3}][H^+]}{[Ce^{+4}][H]}$$

However, after the cerium in the plus four oxidation state has been reduced to the equilibrium concentration the rates of the above equations equalize and a steady state is reached, as is indicated by the flattening out of the curves in FIGURE 2 to the right of the end point.

The negative logarithmic character of the curves in FIGURE 2 is explained by the logarithmic relationship between the E.M.F. generated by the dosimeter cell and the equilibrium of the opposing reactions:

$E.M.F. = nRT \ln K$

Substituting the value of K set forth above, gives:

$$E.M.F. = nRT \ln \frac{[Ce^{+3}][H^+]}{[Ce^{+4}][H]}$$

Therefore, when a sensing device such as a potentiometer gives its readings in voltages, the logarithmic character of the E.M.F. of the cell gives a rapid change in potential as the concentration of the oxidized form of the solution becomes small compared to the reduced form. This is the "end point" or equivalence point when radiation has consumed the material in the original higher oxidation state of the dosimeter solution. The time to reach this point is transferrable to flux rate for a given initial solution concentration.

The following example is given to show the method of calibrating the dosimeter of the invention:

EXAMPLE I

A dosimeter of the kind shown in the drawing was made with a gold cathode and an antimony anode and connected with a G–10 Varian recording potentiometer with a 50-millivolt sensitivity and a 25,000 ohm. resistance, and containing a mechanism translating the potential sensings directly into reps., Roentgen-equivalent-physicals, which are equivalent to 93 egs. per gram of air in X-ray or gamma ray energy. The recorder was warmed up and the electrodes of the dosimeter were cleaned by lightly rubbing with steel wool, rinsed in distilled water, and then with the solution to be used in the dosimeter. Nine solutions, five of ceric sulfate and four of potassium dichromate, as shown in Table I, were prepared and each was placed in the polyethylene beaker-like container of the dosimeter, this being thoroughly cleaned as well as the electrodes each time the solution was changed. Argon gas was admitted to agitate the solution, and the dosimeter was lowered by a cable into a grid of gamma emitting fuel elements at various positions as shown by Table I, the abbreviation rep./hr. meaning the number of "Roentgen-equivalent-physicals" per hour. The chart drive of the recorder was turned on the moment the cell reached its proper position and the apparatus was permitted to function automatically for periods of 9.45 to 60.00 minutes as indicated in Table I. For purposes of comparison a column labelled "Standard Ceric" placed at the extreme right of Table I shows determinations made by a conventional dosimeter with a ceric solution.

*Table I*

COMPARISON OF ELECTROMETRIC WITH STANDARD CERIC DOSE MEASUREMENTS

| Concentration | | Irradiation Time | Gamma Flux | |
|---|---|---|---|---|
| $Ce(SO_4)_2$ $\mu$ eq./l. | $K_2Cr_2O_7$ $\mu$ eq./l. | To reach end point (min.) | Electrometric (rep./hr.) | Standard Ceric (rep./hr.) |
| -------- | 1,000 | 9.45 | $2.35 \times 10^6$ | $2.30 \times 10^6$ |
| 2,580 | -------- | 24.3 | $2.35 \times 10^6$ | -------- |
| 2,580 | -------- | 24.7 | $2.32 \times 10^6$ | -------- |
| -------- | 2,580 | 24.5 | $2.33 \times 10^6$ | -------- |
| -------- | 2,580 | 31.6 | $1.79 \times 10^6$ | -------- |
| -------- | 2,580 | 31.6 | $1.79 \times 10^6$ | $1.75 \times 10^6$ |
| 2,580 | -------- | 33.2 | $1.69 \times 10^6$ | -------- |
| 2,580 | -------- | 31.7 | $1.79 \times 10^6$ | -------- |
| 5,000 | -------- | 60.0 | $1.82 \times 10^6$ | -------- |

EXAMPLE II

After the calibration as above described in Example I the dosimeter of the invention is deemed to be within the required range of accuracy to enable it to determine the flux in gamma fields of unknown intensity. After thorough cleaning of the electrodes and the beaker-like container, they are rinsed with a solution of known concentration of ceric sulfate in 1.0 N sulfuric acid solution, and the container containing the same solution is placed in a gamma flux field of a nuclear reactor fuel element. The chart drive of the potentiometer is turned on, and the argon agitation gas, and the dosimeter is immediately lowered into the unknown flux. After reaching the end point the potentiometer is electrically disconnected from the dosimeter. The dosimeter is removed from the flux and the paper in the chart drive containing the flux field variations in reps. removed therefrom and filed.

It will be understood that this invention is not to be limited to the details given herein, but that it may be modified within the scope of the appended claim.

What is claimed is:

A device for measuring radiation comprising an insulating container containing an aqueous chemical oxidation-reduction system which reacts quantitatively to the radiation and is a member of the group consisting of ceric-cerous, ferric-ferrous, and dichromate systems; the starting material of said oxidation system being a member of the group consisting of ceric sulfate, ferric sulfate, and potassium dichromate in acid solutions; means to stir said chemical oxidation-reduction system; a cathode electrode of the group consisting of gold and platinum; an anode electrode of the group consisting of antimony and tungsten; said anode and cathode electrodes being inserted into said chemical oxidation-reduction system; and a potential sensing device connected across said anode and cathode electrodes.

References Cited in the file of this patent

UNITED STATES PATENTS

| | | |
|---|---|---|
| 2,552,723 | Koury | May 15, 1951 |
| 2,631,246 | Christian | Mar. 10, 1953 |
| 2,696,564 | Ohmart | Dec. 7, 1954 |
| 2,708,242 | Ruben | May 10, 1955 |
| 2,847,585 | Christian | Aug. 12, 1958 |
| 2,921,217 | Chubb | Jan. 12, 1960 |

OTHER REFERENCES

Day et al.: Chemical Dosimetry of Ionizing Radiations, Nucleonics, February 1951, pages 34 to 42.

Harmer: Chemical Dosimetry, Nucleonics, pages 72 and 73, October 1959.

Taimuty: Total-Dose Standards, Nucleonics, October 1959, pages 65 and 66.